US011441936B2

(12) United States Patent
Ribi

(10) Patent No.: US 11,441,936 B2
(45) Date of Patent: Sep. 13, 2022

(54) HOLLOW PROFILE FOR WIM SENSOR AND WIM SENSOR WITH HOLLOW PROFILE

(71) Applicant: Kistler Holding AG, Winterthur (CH)

(72) Inventor: Adrian Ribi, Winterthur (CH)

(73) Assignee: Kistler Holding AG, Winterthur (CH)

( * ) Notice: Subject to any disclaimer, the term of this patent is extended or adjusted under 35 U.S.C. 154(b) by 469 days.

(21) Appl. No.: 16/353,266

(22) Filed: Mar. 14, 2019

(65) Prior Publication Data

US 2019/0285460 A1  Sep. 19, 2019

(30) Foreign Application Priority Data

Mar. 16, 2018 (EP) ..................................... 18162237

(51) Int. Cl.
| | |
|---|---|
| *G01L 1/04* | (2006.01) |
| *G01G 21/00* | (2006.01) |
| *G01G 19/02* | (2006.01) |
| *G01G 19/07* | (2006.01) |
| *G08G 1/02* | (2006.01) |

(52) U.S. Cl.
CPC ........... *G01G 19/024* (2013.01); *G01G 19/07* (2013.01); *G08G 1/02* (2013.01)

(58) Field of Classification Search
CPC .......... G01G 19/03; G01G 5/06; G01G 19/02; G01G 3/13; G01G 19/07; G01G 21/23; G01L 1/16; G01L 5/00; G01L 5/04; G08G 1/01; G08G 1/015; G08G 1/02; E01F 11/00
See application file for complete search history.

(56) References Cited

U.S. PATENT DOCUMENTS

| | | | |
|---|---|---|---|
| 5,461,924 A * | 10/1995 | Calderara | ................ G01G 3/13 73/768 |
| 5,501,111 A | 3/1996 | Sonderegger et al. | |
| 9,304,032 B2 * | 4/2016 | Cornu | ....................... G01L 1/04 |
| 10,921,176 B2 * | 2/2021 | Ribi | ..................... G01G 19/024 |

(Continued)

FOREIGN PATENT DOCUMENTS

| | | |
|---|---|---|
| EP | 0654654 | 5/1995 |
| JP | 2018017733 | 2/2018 |

(Continued)

OTHER PUBLICATIONS

Korean Office Action and Translation, dated Apr. 8, 2020, 7 pages.

(Continued)

*Primary Examiner* — Brandi N Hopkins
(74) *Attorney, Agent, or Firm* — Dority & Manning, P.A.

(57) ABSTRACT

A hollow profile for a WIM sensor elongates along a longitudinal direction and includes a plate-shaped force introduction element, an anchoring element and a tubular element disposed between the force introduction element and the anchoring element. The tubular element is integrally connected to the force introduction element and to the anchoring element and encloses a first cavity. The anchoring element encloses at least one second cavity. The anchoring element, tubular element and force introduction element are formed integrally with each other.

15 Claims, 5 Drawing Sheets

(56) References Cited

U.S. PATENT DOCUMENTS

| | | | |
|---|---|---|---|
| 2014/0251700 A1* | 9/2014 | Cornu | G01G 19/02 |
| | | | 177/136 |
| 2016/0018252 A1 | 1/2016 | Hanson et al. | |
| 2018/0031429 A1 | 2/2018 | Pfluger | |
| 2018/0156655 A1* | 6/2018 | Hanson | G01L 1/14 |

FOREIGN PATENT DOCUMENTS

| | | |
|---|---|---|
| KR | 2013 0012630 | 2/2013 |
| KR | 101819600 | 2/2018 |
| WO | WO2015104265 | 7/2015 |

OTHER PUBLICATIONS

International Search Report, dated Sep. 14, 2018, 6 pages.
Japanese Office Action and English Translation Thereof, JP Application No. 2019-047911, dated Jan. 8, 2020, 8 pages.

* cited by examiner

HOLLOW PROFILE FOR WIM SENSOR AND WIM SENSOR WITH HOLLOW PROFILE

FIELD OF THE INVENTION

The invention relates to a hollow profile for a WIM sensor and to a WIM sensor that includes such a hollow profile.

BACKGROUND OF THE INVENTION

Weigh in Motion (WIM) sensors are inserted in a groove in a roadway to detect dynamic ground reaction forces caused by a vehicle on the roadway. By ground reaction force is meant the reaction of the underground in the form of a force to a first force, which first force is applied to the underground by a body. Usually, a component of a WIM sensor is an elongated hollow profile, in which hollow profile are arranged a plurality of force sensors and which hollow profile crosses one wheel track of the vehicle. A wheel track is the trajectory on the roadway defined by a wheel of the vehicle on the roadway while it is travelling on the roadway.

U.S. Pat. No. 5,461,924, which is hereby incorporated herein by the reference for all purposes, describes a WIM sensor, referred to as hollow profile pickup, to be installed in roadways for determining ground reaction forces having force sensors arranged within its hollow profile that are connected to the wall of a tubular element in a force-fitting manner. The tubular element comprises a force introduction flange that is connected to the tubular element in such a way that a force acting on the force introduction flange is bundled before it is transferred to the force sensor.

Moreover, U.S. Pat. No. 5,461,924 discloses a force introduction flange having a plate like shape. Furthermore, an anchoring flange for mounting in the roadway is described that is arranged on the opposite side of the tubular element. The hollow profile pickup is accommodated in a groove in the roadway and cast with grout. The anchoring flange is attached to the ground. The groove is defined by a length and a width on the same level as that of the surface of the roadway as well as by a depth in a direction perpendicular to the roadway surface. In the following, the member that corresponds to the force introduction flange with respect to function will be referred to as force introduction element. In the following, the member that corresponds to the anchoring flange with respect to function will be referred to as anchoring element.

A roadway consists of a surface layer on which the vehicles travel and of a base layer supporting the surface layer. In the following, the surface layer is defined as the layer that is removed and reapplied during restoration of the roadway. In the following, the base layer is defined as the layer that remains when the roadway is restored for a first time and that is restored only after a plurality of restorations took place. The thickness of the surface layer in a direction perpendicular to the roadway surface varies by country and utilization of the roadway, and according to the ELLPAG PHASE 2 Report of the Forum of European National Highway Research Laboratories of January 2009 is between 60 mm and 200 mm.

By lines of force of the force that a vehicle's tire mounted on a wheel exerts on the roadway is meant a representation of the force acting in subareas of the WIM sensor. Thus, lines of force lead from the tire on the roadway surface into the force introduction element where they are bundled and mainly pass through the force sensor that is arranged in the main force transmission path. The walls of the tubular element form a secondary force transmission path through which a minor portion of the lines of force passes. Afterwards, the lines of force pass through the anchoring flange resting on a substrate that is as stiff as possible. The anchoring flange serves to direct the lines of force onto a substrate that is as stiff as possible. High stiffness of the substrate is important for a well-defined and major part of the force to act on the force sensor in the main force transmission direction. A deformable substrate would be disadvantageous and falsify the force detected by the WIM sensor. The force introduction element of the WIM sensor would sink into the deformable surface when a force is applied. Since the contact area of a tire on the roadway is greater than the width of the WIM sensor in the direction of travel, the tire will be supported by the adjacent roadway surface if the force introduction element sinks into the roadway. This reduces the force acting on the force introduction element. Therefore, for a correct determination of the force acting on a roadway surface, it is essential to firmly anchor the hollow profile with a substrate that is as stiff as possible.

In the prior art represented by U.S. Pat. No. 5,461,924, the electronic members required for detecting or amplifying or converting or evaluating the force signals detected by the force sensors are arranged at least partially outside the hollow profile for reasons of space. Furthermore, electronic members required for operating a WIM sensor, such as for example an electrical energy storage device, are usually arranged outside the hollow profile for reasons of space. In the following, these electronic members are referred to as WIM electronics.

It is usual to accommodate the WIM electronics in a housing next to the roadway, however, this requires long cables that raise the risk of electromagnetic interferences on the WIM electronics.

BRIEF OBJECTS AND SUMMARY OF THE INVENTION

It is a first object of the present invention to provide a volume in the hollow profile, said hollow profile being usable for a WIM sensor, in which volume WIM electronics is housed in the proximity of the force sensor while the length and the width of the groove for mounting the WIM Sensor in the roadway are unchanged or smaller compared to the prior art and the groove is still completely embedded in the surface layer in its entire depth and the base layer is left intact.

It is another object of the present invention to provide a volume in the hollow profile, said hollow profile being usable for a WIM sensor, which volume houses WIM electronics in the proximity of the force sensor wherein said hollow profile has a high stiffness for correct determination of the force acting on the force introduction element.

At least one of these objects is achieved by the features described below.

In accordance with the present invention a hollow profile for a WIM sensor elongates in a longitudinal direction and includes a plate-shaped force introduction element. The hollow profile includes an anchoring element as well as a tubular element that is arranged between the force introduction element and the anchoring element. The tubular element defines and encloses a first cavity. The anchoring element, the tubular element and the force introduction element desirably are formed integrally with each other. The tubular element is integrally connected to the force introduction element and to the anchoring element and defines and encloses at least one second cavity.

First cavity and second cavity are designed to extend over the entire length of the hollow profile. When the hollow profile is used in a WIM sensor, force sensors are arranged in the first cavity. Analogously to the prior art as represented by U.S. Pat. No. 5,461,924, the force acting on the force introduction element acts at least partially on the force sensors. In contrast to force sensors in a WIM sensor of the prior art according to U.S. Pat. No. 5,461,924 the force acting on the force sensors is not substantially changed due to the shape of the anchoring element that accommodates the second cavity.

The allowable height of a WIM sensor is limited by the fact that the depth of the groove must not extend to the base layer of the roadway. Furthermore, the allowable height of a WIM sensor is limited by the fact that the WIM sensor must be flush with the roadway surface. The WIM sensor is flush with the roadway surface when no portion of the WIM sensor protrudes beyond the roadway surface in a height direction. Usually, the WIM sensor comprises a coating on the force introduction element. The height direction is the direction perpendicular to the roadway surface. The depth of the groove is understood as referring to the height direction.

When the hollow profile is used in a WIM sensor, the WIM electronics is arranged in the second cavity. Thus, short lengths of the cables between WIM electronics and force sensors are achieved. In one embodiment of the WIM sensor, since a component of the WIM electronics is an electrical energy storage device, an operating period of a WIM sensor comprising the electrical energy storage device as its sole power supply will depend on the volume of the second cavity. Therefore, the shape of the anchoring element of the hollow profile is optimized to keep the height of the anchoring element within the allowable range while achieving the largest possible volume of the second cavity.

The WIM sensor according to the invention may be used in most roadways worldwide. The prerequisite for usability is that a groove for mounting the WIM sensor must leave the base layer intact. This will be the case for most roadways worldwide if the hollow profile for the WIM sensor has a maximum height of 60 mm. In addition, the optimization of the shape of the anchoring element saves material for producing such a hollow profile.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

DETAILED DESCRIPTION OF EXEMPLARY EMBODIMENTS

Figure 1:
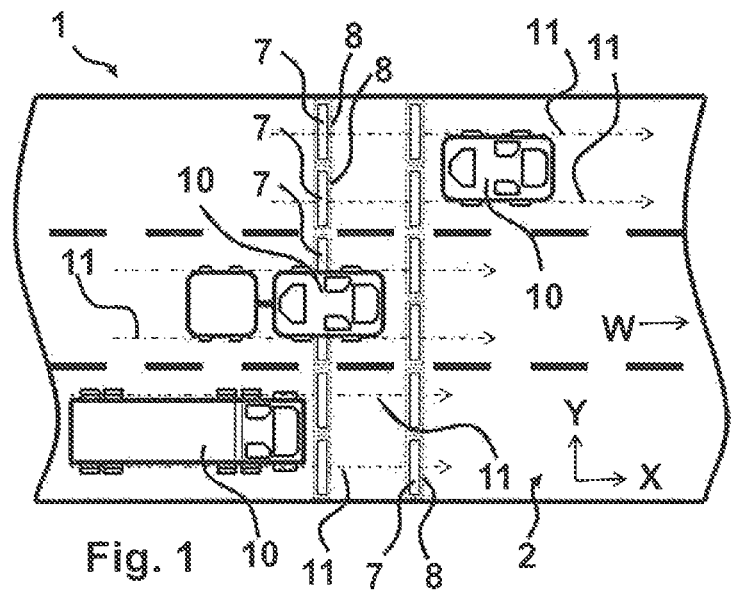
FIG. 1 shows a partial view of a roadway with a plurality of lanes with vehicles and with WIM sensors arranged in the roadway.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

Reference will now be made in detail to present exemplary embodiments of the invention, wherein one or more examples of which are illustrated in the accompanying drawings. The detailed description uses numerical and letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

FIG. 1 shows a partial view looking down from above a roadway 1 with WIM sensors 7 arranged in the roadway 1. Each WIM sensor 7 is arranged with its longitudinal axis perpendicular to the roadway direction W, each crossing one wheel track 11 of a vehicle 10, said wheel track 11 being represented by a chain-dashed line with an arrow to indicate the direction. The roadway direction W is the direction of the roadway in which vehicles 10 primarily travel on the roadway 1. The hollow profile 70 according to the invention is intended for use in a WIM sensor 7 arranged in a roadway 1.

Figure 2:
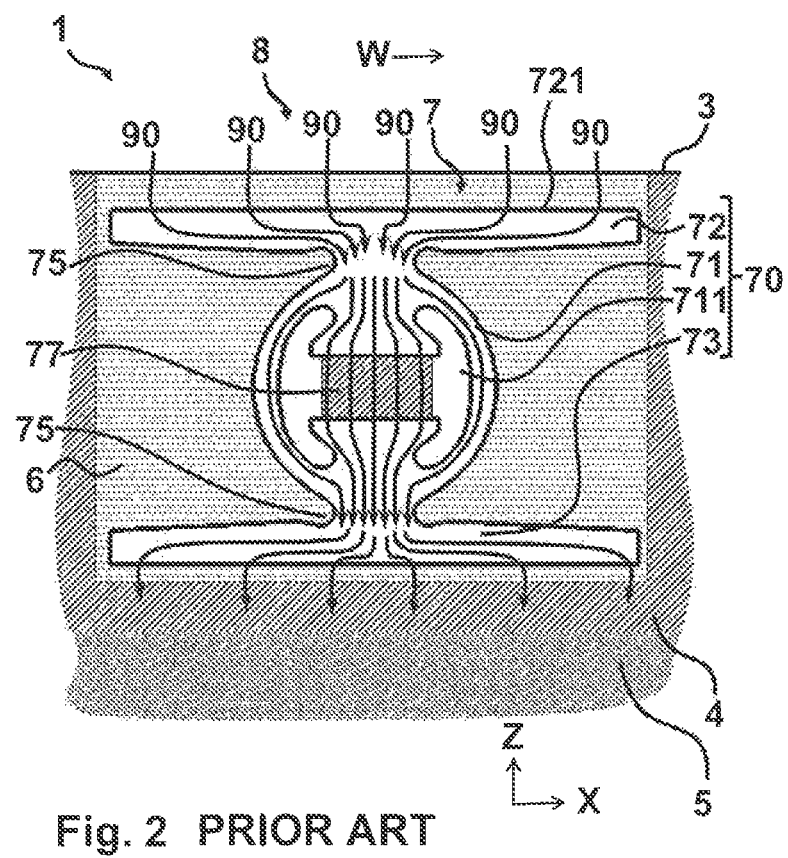
FIG. 2 shows a partial view of a hollow profile for a WIM sensor comprising a force sensor according to the prior art in a mounted state in a roadway.

FIG. 2 shows a partial view cut in a plane that defines the width and height of a hollow profile 70 for a WIM sensor 7 according to the prior art. The hollow profile 70 is arranged in a groove 8 in the surface layer 4 of the roadway 1 and secured in the groove 8 by means of grout 6. In one embodiment, grout 6 consists of different materials disposed in different positions in the groove 8.

Figure 3:
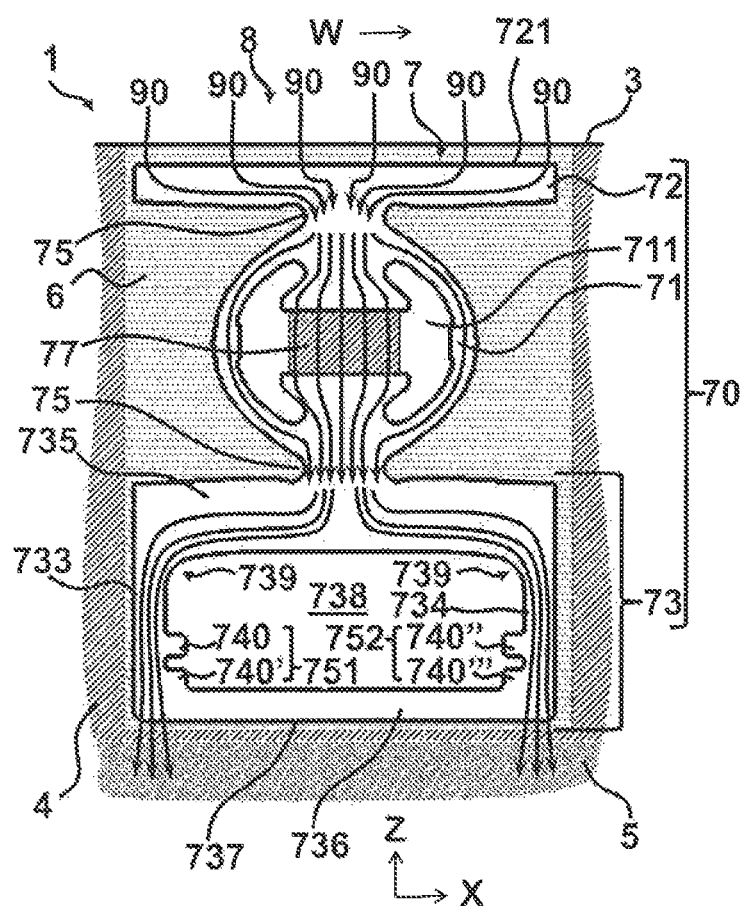
FIG. 3 shows a partial view of an advantageous embodiment in accordance with the present invention of a hollow profile for a WIM sensor comprising a force sensor in a mounted state in a roadway.

In accordance with the present invention, FIG. 3 shows a partial view cut in a plane that defines the width and height of an advantageous embodiment of a hollow profile 70 for a WIM sensor 7. Thus, hollow profile 70 is shown in a view perpendicular to the longitudinal direction Y, in which longitudinal direction Y the hollow profile 70 has an elongated shape.

Hollow profile 70 comprises a plate-shaped force introduction element 72 (aka force introduction element 72) having the width of the hollow profile 70 in the width direction X as its larger dimension perpendicularly to the longitudinal direction Y and the thickness of the force introduction element 72 in the height direction Z as its smaller dimension perpendicularly to the longitudinal direction Y. In the intended use of the hollow profile 70, the force introduction element 72 is arranged substantially parallel to the roadway surface 3 with the height direction Z extending perpendicularly to the roadway surface 3.

The surface of the force introduction element 72 closest to the roadway surface 3 is the force introduction surface 721. With regard to the hollow profile 70, the height direction Z is perpendicular to the force introduction surface 721. Hollow profile 70 is inserted in a groove 8 in the roadway 1, a width of groove 8 extending in the roadway direction 7 and a depth of groove 8 extending in the height direction Z. Hollow profile 70 comprises an anchoring element 73. A tubular element 71 is arranged between the force introduction element 72 and the anchoring element 73, which tubular element 71 encloses the first cavity 711. Anchoring element 73 and tubular element 71 and force introduction element 72 are formed integrally with each other. Tubular element 71 is integrally connected to the force introduction element 72 and to the anchoring element 73.

The connection 75 of the force introduction element 72 and the tubular element 71 as well as the function of the force introduction element 72 and the tubular element 71 are identical to the prior art described in U.S. Pat. No. 5,461,924. Forces acting onto the roadway surface 3 are bundled by the force introduction element 72 into the tubular element 71 and predominantly act on at least one force sensor 77 arranged in the tubular element 71.

In a presently preferred embodiment, anchoring element 73 is substantially cuboid in shape having a substantially rectangular cross section perpendicular to the longitudinal axis, as shown in FIG. 3. Anchoring element 73 has an internal space in the rectangular cross section that is completely enclosed by the rectangular cross section. Thereby, anchoring element 73 encloses a second cavity 738. The second cavity 738 is defined by four walls each with an inner surface, which inner surface faces the second cavity 738, and each with an outer surface. The four walls are referred to as upper wall 735, lower wall 736, front wall 733, and rear wall 734. The outer surfaces of the walls 733, 734, 735, 736 form the outer surfaces that define the cuboid shape of the anchoring element 73. In an advantageous embodiment as shown in FIG. 3 for example, force introduction element 72 and anchoring element 73 are arranged diametrically opposite to each other around the tubular element 71.

When the hollow profile 70 is installed, the outer surface facing away from tubular element 71, referred to as lower anchoring surface 737, extends substantially parallel to the roadway surface 3. The anchoring surface is a portion of the lower wall 736 and the exterior surface thereof.

The plate-shaped upper wall 735 of anchoring element 73 extends substantially parallel to the lower wall 736. The outer surface of the upper wall 735 comprises an integral connection 75 to the tubular element 71. The connection 75 of upper wall 735 and tubular element 71 is such that lines of force 90 emerging from the tubular element 71 in a bundled form act on the upper wall 735 in a manner analog to the prior art known from U.S. Pat. No. 5,461,924.

Figure 8:
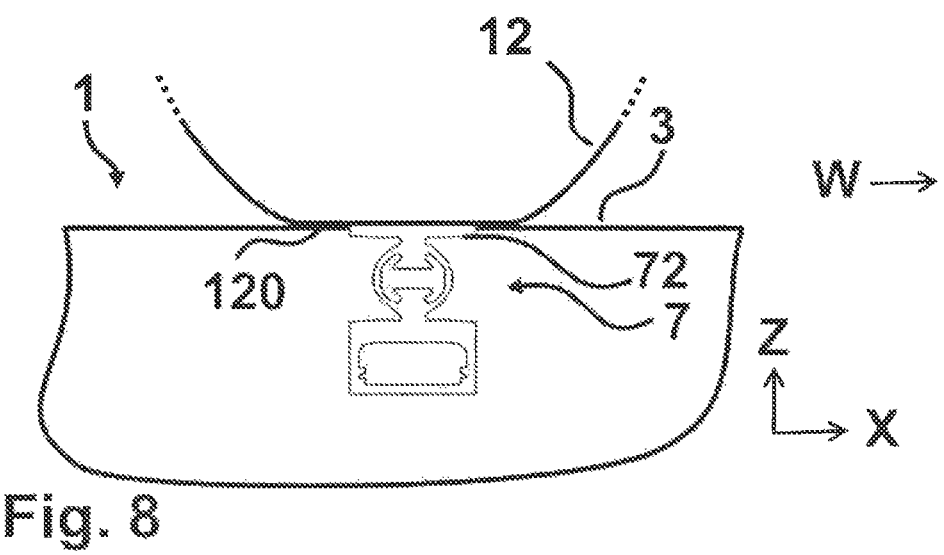
FIG. 8 shows a schematic representation of the tire of a vehicle passing over an embodiment of a hollow profile in accordance with the present invention.

In contrast to the prior art, the inner surface of the upper wall 735 of anchoring element 73 is not supported by a stiff base layer 5 since the second cavity 738 is arranged between the upper wall 735 and the base layer 5. The configuration of the upper wall 735 and the front wall 733 and the rear wall 734 and the lower wall 736 of the hollow profile 70 is such that when the hollow profile 70 is used in a WIM sensor 7 and a defined external force acts on the force introduction element 72, a deflection of the upper wall 735 in the direction of the lower wall 736 is less than 50 micrometers with respect to the original position of the upper wall 735 without the action of an external force. FIG. 8 is a schematic representation of the tire 12 of a vehicle passing over and embodiment of a hollow profile in accordance with the present invention. The defined acting external force is determined arbitrarily and corresponds to the force that a wheel 12 having a contact area 120 of 315 mm by 200 mm exerts onto the roadway 1 and the WIM sensor 7 mounted in the roadway 1, which wheel 12 is pressed on the roadway 1 with a force of 120 kN.

Furthermore, the configuration of the hollow profile 70 is such that if the hollow profile 70 is used in a WIM sensor 7, the stiffness normalized to an area perpendicular to the height direction Z, hereinafter referred to as area-normalized stiffness, in the height direction Z of the WIM sensor 7 is greater than 500 Mega Pascals per millimeter (MPa/mm) at a temperature of the hollow profile 70 of 20° C. The area-normalized stiffness is defined as follows. The hollow profile 70 may be regarded as a spring having a spring constant k1, and the force sensor 77 may be regarded as a spring having a spring constant k2 being at least one order of magnitude higher than the spring constant k1 of the hollow profile 70. The total spring constant k3 of the two springs arranged in series is calculated from the reciprocal of the sum of the reciprocals of the spring constants k3=(k1−1+k2−1)−1 which relation can be expressed as k3=1/(1/k1+1/k2) and therefore is dominated by the spring constant k1 of the hollow profile 70. Generally, a spring constant is defined as a force F per change in length ΔL wherein k3=F/ΔL. The area-normalized stiffness is the spring constant divided by an area A. Thus, the area-normalized stiffness is a force F divided by an area A and divided by a change in length ΔL wherein k3=F/ΔL/A. The area A corresponds to the force introduction surface 721 of the WIM sensor 7 contacted by the tire. The force F corresponds to the component of the force which a tire 12 having a contact area 120 of 315 mm by 200 mm exerts on the roadway 1 onto the force introduction surface 721 contacted by the tire 12, which tire 12 is pressed on the roadway 1 with a force of 120 kN. It should be understood that the action of the force F is not uniform over the area A and that the tire 12 is centered above the WIM sensor 7. The change in length ΔL in the height direction Z of the hollow profile 70 comprising the force sensor 77 is mainly given by the deflection of the upper wall 735 towards the lower wall 736 when the hollow profile 70 is used in a WIM sensor 7, and by the defined external force that acts on the force introduction element 72. The deflection is relative to the initial position of the upper wall 735 without an external force acting on the force introduction element 72. The specification of ΔL as less than 50 micrometers is based on a value of 500 MPa/mm for the area-normalized stiffness of the WIM sensor 7.

Therefore, the upper wall 735 is configured such that the lines of force 90 are directed into the front wall 733 and the rear wall 734, as shown schematically in FIG. 3. The front wall 733 connects the upper wall 735 and the lower wall 736. The rear wall 734 connects the upper wall 735 and the lower wall 736.

In contrast to the prior art according to U.S. Pat. No. 5,461,924, the upper wall 735 has a greater thickness in the height direction Z of the hollow profile 70 than the anchoring element 73 according to U.S. Pat. No. 5,461,924. However, in an advantageous embodiment according to the present invention, the upper wall 735 has not more than 1/7 of the dimension of the hollow profile 70 in the height direction Z. In a presently preferred embodiment according to the present invention, the upper wall 735 has not more than 1/8 of the dimension of the hollow profile 70 in the height direction Z. At the same time, the upper wall 735 has a thickness in the height direction Z of the hollow profile 70 of at least 1/7 of the dimension of the force introduction element 72 in the width direction X of the hollow profile 70. Furthermore, the transition from the inner surface of the upper wall 735 to the inner surface of the front wall 733 is formed as a fillet 739, which is a concave fillet of an edge, which edge is given by two rectangular plates touching each other in more than one point and being not parallel to each other. In a sectional view, the fillet 739 has the shape of a section of a circle or of a continuous and strictly monotonic function. For each point of the fillet 739, a radius can be determined by means of limit value generation. In an advantageous embodiment according to the present invention, the smallest radius of the fillet 739 is greater than 1/100 of the dimension of the hollow profile 70 in the height direction Z, and in a presently preferred embodiment the smallest radius of the fillet 739 is greater than 1/50 of the dimension of the hollow profile 70 in the height direction Z.

In a presently preferred embodiment, the distance between the force introduction surface 721 and the lower anchoring surface 737 along the height direction Z is less than 60 mm. In another presently preferred embodiment, the distance between the force introduction surface 721 and the lower anchoring surface 737 along the height direction Z is less than 55 mm. In some embodiments, the force introduction surface 721 includes a coating that does not contribute to the distance along the height direction Z between the force introduction surface 721 and the lower anchoring surface 737 in a WIM sensor 7.

Figure 4:
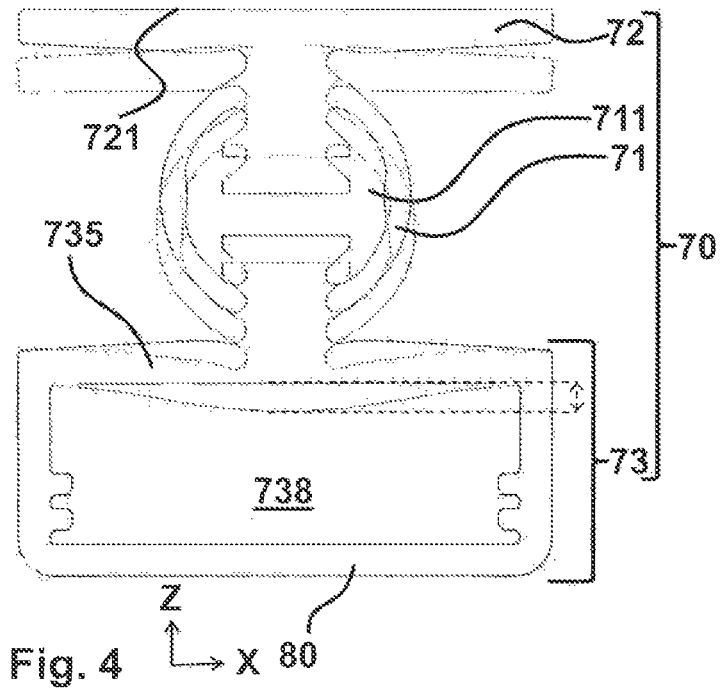
FIG. 4 shows a schematic partial view of a hollow profile for a WIM sensor in accordance with the present invention illustrating a deformation under the action of a force.
Figure 5:
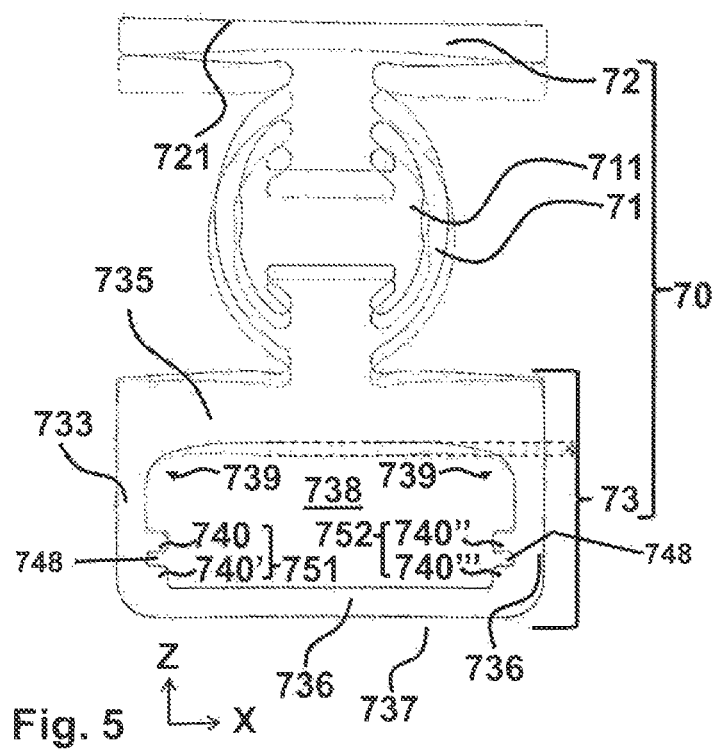
FIG. 5 shows a schematic partial view of an advantageous hollow profile in accordance with the present invention for a WIM sensor illustrating a deformation under the action of a force.

A comparison of FIGS. 4 and 5 clearly shows an advantage of a presently preferred embodiment of the hollow profile 70. FIG. 4 shows a hollow profile 70 that adds features to the hollow profile in the most closely related prior art as shown in FIG. 1. Thus, the hollow profile 70 in FIG. 4 additionally comprises a U-shaped profile element 80. In respect to the height direction Z, the U-shaped profile element 80 can be thought of as being arranged below the hollow profile 70 of FIG. 1. Considering the anchoring element 73 of the hollow profile 70 shown in FIG. 1, the U-shaped profile element 80 can be thought of as forming a second cavity 738 beneath the anchoring element 73 of the hollow profile 70 shown in FIG. 1.

The solid line in FIG. 4 shows the hollow profile 70 without a force acting thereon, while the dashed line shows the hollow profile 70 while a force acts on the force introduction surface 721. This force corresponds to the force resulting from a tire being present centrally above a hollow profile 70 arranged in a roadway 1 and having a contact area 120 of 315 mm times 200 mm and being pressed against the roadway surface 3 (FIGS. 2 and 3) with a force of 120 kN. To better illustrate this point, the deformation of the hollow profile 70 is greatly exaggerated in the schematic representation in FIG. 4, and force sensors 77 (FIGS. 2 and 3) disposed in the hollow profile 70 have been omitted for clarity. The upper wall 735 that partially defines the second cavity 738 of the second space is deflected by more than 100 micrometers towards the lower wall 736 in the height direction Z as indicated by the dashed double arrow. Therefore, the force introduction element 72 is markedly displaced towards the base layer 5 (FIGS. 2 and 3) in the height direction Z.

FIG. 5 shows a presently preferred embodiment of the hollow profile 70. Similar to FIG. 4, the solid line in FIG. 5 shows the hollow profile 70 without a force acting thereon, while the dotted line shows the hollow profile 70 with a force acting onto the force introduction surface 721, and the force corresponds to the force exerted by a vehicle's tire 12 being present centrally above a hollow profile 70 arranged in a roadway 1 and having a contact area 120 of 315 mm times 200 mm and being pressed against the roadway surface 3 with a force of 120 kN. The deformation of the hollow profile 70 is greatly exaggerated in the schematic representation for better illustration. Force sensors 77 disposed in the hollow profile 70 have been omitted for clarity. The upper wall 735 of the second space is deflected by less than 50 micrometers towards the lower wall 736 in the height direction Z as indicated by the dashed double arrow. Therefore, the force introduction element 72 remains more or less in the same position with respect to the height direction Z.

In a presently preferred embodiment shown in FIG. 5, the front wall 733 comprises at its inner surface at least two ledges 740, 740' having a rectangular cross section in a direction perpendicular to the longitudinal direction Y and spaced apart from each other in the height direction Z. Ledges 740, 740' of the front wall 733 are spaced apart from the fillet 739 in the height direction Z. One ledge 740' of the front wall 733 at a maximum may abut on the inner surface of the lower wall 736. The ledges 740, 740' form a channel 748 between them, and the channel 748 has dimensions measured in the height direction Z and in the width direction X. In a presently preferred embodiment, the inner surface of the rear wall 734 similarly comprises at least two ledges 740", 740''' formed in a mirror-symmetrical manner to the ledges 740, 740' on the inner surface of the front wall 733 wherein a symmetry plane is defined by the longitudinal direction Y and the height direction Z. Ledges 740 of the inner surface of the front wall 733 combine to form a front guiding element 751. Similarly, ledges 740-740''' of the inner surface of the rear wall 734 combine to form a rear guiding element 752. Into the channels 748 of the guiding elements 751, 752 may be inserted a plate-shaped element, for example a circuit board, which plate shaped element is supported and retained by the guiding elements 751, 752 on both sides with respect to the width direction X.

In contrast to a WIM sensor 7 known from U.S. Pat. No. 5,461,924, when using a hollow profile 70 in a presently preferred embodiment in accordance with the present invention with a second cavity 738 for a WIM sensor 7 and an external force acts on the force introduction element 72, then the component of the force that acts on the force sensor 77 in the main force transmission path is only insignificantly changed. By an insignificant change is meant a change of less than 1% of the component of the force that acts on the force sensor 77 as compared to the force component acting on the force sensor 77 of a WIM sensor 7 known from U.S. Pat. No. 5,461,924.

When a force acts on the WIM sensor, the force introduction element 72 of the WIM sensor 7 is displaced in the direction of the force. For this reason, an anchoring element 73 that is deformable in the height direction Z has a disadvantageous effect and falsifies the force detected by the WIM sensor 7. As schematically shown in FIG. 8, since the contact area 120 of a tire 12 on the roadway 1 is greater than the width of the WIM sensor 7 in the direction of travel, the tire 12 is supported by the surrounding roadway surface 3 when the force introduction element 72 sinks into the surface. The tire 12 is not able to follow the displaced force introduction flange over any possible distance whereby the magnitude of the force acting on the force introduction element 72 is less than the full magnitude of force exerted by the tire 12 on the roadway 3.

Therefore, an area-normalized stiffness of at least 500 MPa/mm of the WIM sensor 7 in the height direction Z together with a base layer 5 that is as stiff as possible are essential for correct determination of the force acting on the roadway surface 3.

When used in a WIM sensor 7, the hollow profile 70 is advantageously made of an electrically conductive material, such as a metal or metal alloy. This has the advantage that elements arranged in the first cavity 711 and in the second cavity 738 such as force sensors 77 and WIM electronics 74 are surrounded by a uniform electrical potential due to the integrally formed hollow profile 70. Since the surface layer 4 and the base layer 5 contact each other over a large area, this potential is the ground potential. Since the hollow profile 70 is grounded, elements disposed in the first cavity 711 and in the second cavity 738 are shielded from electromagnetic waves thereby avoiding electromagnetic interferences of the signals emitted by the force sensor 77 and the WIM electronics 74. Grounding of the hollow profile 70 desirably is achieved via an electrical conductor in frictional or material connection to the hollow profile 70. The connection for grounding the hollow profile 70 is made in the first cavity or in the second cavity or at an outer surface of the hollow profile.

In a presently preferred embodiment, the hollow profile 70 defines at least one passage that is configured and disposed to interconnect the first cavity 711 with the second cavity 738.

Figure 7:
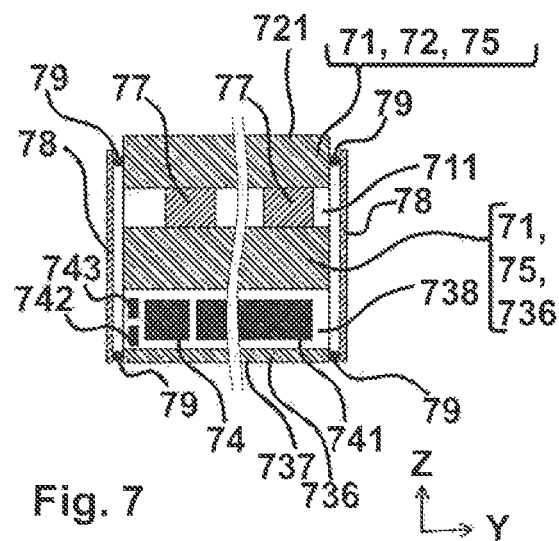
FIG. 7 shows a partial view of an advantageous embodiment of a hollow profile in accordance with the present invention for a WIM sensor comprising a force sensor.

For use in a WIM sensor 7, the hollow profile 70 is advantageously closed by a cover 78 at a first end with respect to the longitudinal direction Y, as shown in FIG. 7. For use in a WIM sensor 7, the hollow profile 70 is advantageously closed by a cover 78 at a second end with respect to the longitudinal direction Y. Each cover 78 desirably is configured and disposed to close off the internal space of the first cavity 711 and the second cavity 738 from a respective end of the hollow profile 70.

Figure 6:
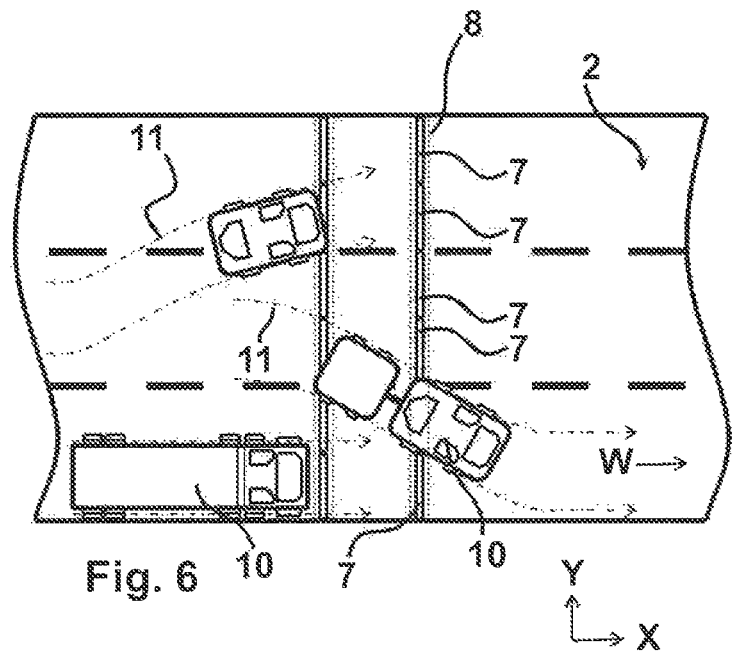
FIG. 6 shows a partial view of a roadway with a plurality of lanes with vehicles and with WIM sensors arranged in the roadway in an advantageous manner.

In the longitudinal direction Y, cover 78 contributes a maximum of 5 mm to the length of the hollow profile 70 with respect to the longitudinal direction Y so that the WIM sensor 7 is at a maximum 10 mm longer than the hollow profile 70 with respect to the longitudinal direction Y. In the case of two WIM sensors 7 arranged with their ends adjacent and abutting to each other with respect to the longitudinal direction Y in a continuous groove 8 in the surface layer 4, the distance between the force sensors 77 arranged at the outer ends of the hollow profile 70 is less than 200 mm. Wheels crossing these WIM sensors 7 that are arranged side by side with abutting ends above the abutting ends of the WIM sensors 7 can be detected by the WIM sensors 7. This has the advantage that multi-lane roadways may be crossed with a plurality of adjacent WIM sensors 7, as shown in FIG. 6. A continuous groove 8 may extend through a plurality of lanes of a roadway 1 and the WIM sensors 7 in the groove 8 may be arranged side by side with their ends abutting to each other in the groove 8. A force acting on the roadway 1 may be detected in any position along the groove 8 continuously without interruption over the total length of the groove 8. Thus, it is possible to precisely detect wheels of vehicles 10 not traveling in the designated lane by the WIM sensors 7 and to determine a ground reaction force.

As shown in FIG. 7, cover 78 comprises a circumferential sealing element 79. The first cavity 711 and the second cavity 738 are hermetically sealed by the cover 78. In one embodiment, a sealing element 79 is a seal made of plastic or metal which is arranged in a frictional connection between the hollow profile 70 and the cover 78. In another embodiment, a sealing element 79 is provided by a material connection of the cover 78 and the hollow profile 70, for example by an adhesive, a resin, a soldered connection or a welded connection. This hermetically sealed by the cover 78 has the advantage that the WIM electronics 74 and the force sensors 77 are protected from external conditions such as moisture, liquids, gases, dust, and other particles.

In one embodiment, the second cavity 738 comprises an electrical energy storage device 741, as shown in FIG. 7.

In one embodiment of the WIM sensor 7, at least one cover 78 is transparent to at least one frequency of an electromagnetic wave having a frequency in the ISM (industrial, scientific and medical) band between 6.765 MHz and 246 GHz. Transparent in this context means an attenuation of the intensity of the electromagnetic waves of not more than 50%. In this embodiment, as shown in FIG. 7, a radio unit 743 for wireless transmission of data signals is arranged in the second cavity 738, which data signals originate from an evaluation or conversion of the force signals detected by the force sensors 77. Because the cover 78 does not require any cable bushing, hermetic sealing of the hollow profile 70 becomes much easier and less expensive and provides this advantage.

In another embodiment, at least one cover 78 is transparent for at least one frequency of an electromagnetic wave between 10 kHz and 5 MHz, and the second cavity 738 comprises a transmission unit 742 for wireless transmission of electrical energy, as shown in FIG. 7.

LIST OF REFERENCE NUMERALS 1 roadway
3 roadway surface
4 surface layer
5 base layer
6 grout
7 WIM sensor
8 groove
9 surface of tire
10 vehicle
11 wheel track
12 tire of vehicle's wheel
70 profile
71 tubular element
72 force introduction element 73 anchoring element
74 WIM electronics
75 connection
77 force sensor
78 cover
79 sealing element
80 U-shaped profile element
90 line of force
120 contact area of tire with the roadway surface
711 first cavity
721 force introduction surface
733 front wall
734 rear wall
735 upper wall
736 lower wall
737 lower anchoring surface
738 second cavity
739 fillet
740, 704', 740'', 740''' ledge
741 storage device
742 transmission unit
743 radio unit
748 channels
751 front guiding element
752 rear guiding element
W roadway direction
X width direction
Y longitudinal direction
Z height direction

What is claimed is:

1. A hollow profile for a WIM sensor, the hollow profile defining a longitudinal direction, a height direction that is orthogonal to the longitudinal direction, and a width direction that is orthogonal to both the longitudinal direction and the height direction, the hollow profile comprising:
 a force introduction element that is elongated along the longitudinal direction;
 an anchoring element that is elongated along the longitudinal direction;
 a tubular element that is elongated along the longitudinal direction and arranged between the force introduction element and the anchoring element and enclosing a first cavity, wherein the tubular element is integrally connected to the force introduction element and to the anchoring element, and wherein the anchoring element, the tubular element and the force introduction element are formed integrally with each other; and
 wherein the anchoring element encloses a second cavity that is disposed spaced apart in the height direction from the first cavity and aligned with the first cavity along the height direction.

2. The hollow profile according to claim 1, wherein the force introduction element and the anchoring element are arranged diametrically opposite to each other around the tubular element.

3. The hollow profile according to claim 2, wherein the anchoring element is substantially cuboid in shape; the anchoring element includes a lower anchoring surface that faces away from the tubular element; the anchoring surface is perpendicular to the height direction; the second cavity defines an internal space that is delimited by a plate-shaped upper wall of the lower anchoring element, the second cavity is delimited by a plate-shaped lower wall of the anchoring element, the upper wall and the lower wall being substantially parallel to each other, the second cavity is delimited by a plate-shaped front wall of the anchoring element; wherein the front wall connects the upper wall and the lower wall; the second cavity is delimited by a plate-shaped rear wall of the anchoring element; wherein the rear wall connects the upper wall and the lower wall; and wherein the front wall and the rear wall are spaced apart in the width direction.

4. The hollow profile according to claim 3, wherein a first fillet defines a transition from the upper wall to the front wall in the internal space; wherein a second fillet defines a transition from the upper wall to the rear wall in the internal space.

5. The hollow profile according to claim 4, wherein the force introduction element a force introduction surface that faces away from the tubular element, said force introduction surface being arranged substantially parallel to the lower anchoring surface; and wherein the distance between the force introduction surface and the lower anchoring surface measured along the height direction is less than 55 mm.

6. The hollow profile according to claim 3, wherein the front wall has a front guiding element; the rear wall has a rear guiding element; wherein a plate-shaped element is insertable in the front guiding element and in the rear guiding element.

7. A WIM sensor mounted in a roadway, the WIM sensor comprising:
 a hollow profile that includes:
  a force introduction element that is plate-shaped and elongated along a longitudinal direction;
  an anchoring element that is elongated along the longitudinal direction;
  a tubular element that is elongated along the longitudinal direction and arranged between the force introduction element and the anchoring element and enclosing a first cavity, wherein the tubular element is integrally connected to the force introduction element and to the anchoring element, and wherein the anchoring element, the tubular element and the force introduction element are formed integrally with each other; and
  wherein the anchoring element encloses a second cavity that defines an internal space, wherein the second cavity is disposed spaced apart in the height direction from the first cavity and aligned with the first cavity along the height direction;
 a force sensor is arranged in the tubular element of the hollow profile;
 wherein under an action of an external force onto the force introduction element a flow of forces through the force introduction element acts on the tubular element, wherein the tubular element defines a tube wall that is configured to lie in a secondary force path of the flow of forces when the force sensor lies in a main force path of the flow of forces; wherein the component of the force acting in the main force path acts on the force sensor; and wherein the second cavity is configured to change the force acting onto the force sensor by less than 1% as compared to a WIM sensor comprising a plate-shaped anchoring element without a cavity.

8. The WIM sensor according to claim 7, wherein the hollow profile is made of an electrically conductive material, a metal or a metal alloy that maintains the internal space of the second cavity at a uniform electrical potential that is the ground potential.

9. The WIM sensor according to claim 7, wherein the WIM sensor has a surface-normalized stiffness of at least 500 MPa/mm in a height direction that is perpendicular to the force introduction surface.

10. The WIM sensor according to claim 7, further comprising a first cover configured and disposed to close a first end of the hollow profile; said first cover covering the internal space of the first and second cavities; and a second cover configured and disposed to close a second end of the hollow profile; and wherein the covers add to the length of the WIM sensor a maximum of 10 mm as compared to the length of the hollow profile along the longitudinal direction.

11. The WIM sensor according to claim 10, wherein each respective cover includes a respective circumferential sealing element; and wherein the first cover hermetically seals the first cavity and the second cover hermetically seals the second cavity.

12. The WIM sensor according to claim 10, further comprising a radio unit configured for wireless transmission of data, wherein the radio unit is disposed in the second cavity and wherein the second cover is configured to be penetrable by electromagnetic waves with a frequency between 6.765 MHz and 246 GHz.

13. A measuring method using a first WIM sensor configured according to claim 7 and a second WIM sensor configured according to claim 7, wherein the WIM sensors are arranged with abutting ends adjacent to each other in a continuous groove spanning several lanes of a roadway, the method comprising the steps of: using the first WIM sensor to detect a force acting on the roadway at a first position along the groove while simultaneously using the second WIM sensor to detect a force acting on the roadway at a second position along the groove.

14. A WIM sensor mounted in a roadway, the WIM sensor comprising:
a hollow profile that includes:
a force introduction element that is plate-shaped and elongated along a longitudinal direction;
an anchoring element that is elongated along the longitudinal direction;
a tubular element that is elongated along the longitudinal direction and arranged between the force introduction element and the anchoring element and enclosing a first cavity, wherein the tubular element is integrally connected to the force introduction element and to the anchoring element, and wherein the anchoring element, the tubular element and the force introduction element are formed integrally with each other; and
wherein the anchoring element encloses a second cavity that defines an internal space;
a force sensor is arranged in the tubular element of the hollow profile;
an electrical energy storage device disposed in the second cavity; and
wherein under an action of an external force onto the force introduction element a flow of forces through the force introduction element acts on the tubular element, wherein the tubular element defines a tube wall that is configured to lie in a secondary force path of the flow of forces when the force sensor lies in a main force path of the flow of forces; wherein the component of the force acting in the main force path acts on the force sensor; and wherein the second cavity is configured to change the force acting onto the force sensor by less than 1% as compared to a WIM sensor comprising a plate-shaped anchoring element without a cavity.

15. The WIM sensor according to claim 14, further comprising a radio unit configured for wireless transmission of data, wherein the radio unit is disposed in the second cavity and wherein the second cover is configured to be penetrable by electromagnetic waves with a frequency between 10 kHz and 5 MHz.

* * * * *